(12) United States Patent
Leisenheimer et al.

(10) Patent No.: US 11,255,697 B2
(45) Date of Patent: Feb. 22, 2022

(54) CONTROL STICK INCLUDING A SINGLE MAGNETIC SENSOR FOR TWIST ANGLE AND TILT ANGLE DETECTION

(71) Applicant: Infineon Technologies AG, Neubiberg (DE)

(72) Inventors: Stephan Leisenheimer, Deisenhofen (DE); Richard Heinz, Munich (DE); Sigmund Zaruba, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 127 days.

(21) Appl. No.: 16/717,568

(22) Filed: Dec. 17, 2019

(65) Prior Publication Data
US 2021/0180988 A1 Jun. 17, 2021

(51) Int. Cl.
*G01D 5/14* (2006.01)
*G01B 7/30* (2006.01)

(52) U.S. Cl.
CPC ............... *G01D 5/145* (2013.01); *G01B 7/30* (2013.01)

(58) Field of Classification Search
CPC .................................. G01D 5/145; G01B 7/30
See application file for complete search history.

(56) References Cited

U.S. PATENT DOCUMENTS

| | | | | |
|---|---|---|---|---|
| 5,559,432 A | * | 9/1996 | Logue .................... | B82Y 15/00 244/234 |
| 5,831,596 A | * | 11/1998 | Marshall ................ | H03K 17/97 345/161 |
| 5,850,142 A | | 12/1998 | Rountos et al. | |
| 8,089,459 B2 | | 1/2012 | Passaro et al. | |
| 2006/0274040 A1 | | 12/2006 | Passaro et al. | |
| 2010/0018338 A1 | | 1/2010 | Mauch | |
| 2010/0265176 A1 | | 10/2010 | Olsson et al. | |
| 2012/0025809 A1 | * | 2/2012 | Banerjee .................. | G01D 5/12 324/207.2 |
| 2015/0368875 A1 | | 12/2015 | Cook et al. | |

FOREIGN PATENT DOCUMENTS

WO 2019053066 A1 3/2019

OTHER PUBLICATIONS

Extended European Search Report for Application No. EP20214507. 4, dated May 20, 2021, 9 pages.

* cited by examiner

*Primary Examiner* — Reena Aurora
(74) *Attorney, Agent, or Firm* — Harrity & Harrity, LLP

(57) ABSTRACT

A control stick may include a magnet and a three-dimensional (3D) magnetic sensor. The 3D magnetic sensor may determine a twist angle of a handle of the control stick based on a strength of a magnetic field at the 3D magnetic sensor. A twisting of the handle may modify an air gap between the 3D magnetic sensor and the magnet. The strength of the magnetic field may be based on strengths of first, second, and third magnetic field components. The 3D magnetic sensor may determine a tilt angle of the handle based on a ratio of the strength of the first magnetic field component to the strength of the third magnetic field component. A tilting of the handle in a direction corresponding to the first magnetic field component may modify the ratio of the strength of the first magnetic field component to the strength of the third magnetic field component.

20 Claims, 7 Drawing Sheets

400

410 — Determine a twist angle of a handle of a control stick based on a strength of a magnetic field, wherein a twisting of the handle modifies an air gap between a magnetic sensor and a magnet that produces the magnetic field, and wherein the strength of the magnetic field is based on a strength of a first magnetic field component, a strength of a second magnetic field component, and a strength of a third magnetic field component, wherein the first magnetic field component, the second magnetic field component, and the third magnetic field component are orthogonal components of the magnetic field

420 — Determine a tilt angle of the handle of the control stick based on a ratio of the strength of the first magnetic field component to the strength of the third magnetic field component, wherein a tilting of the handle in a direction corresponding to the first magnetic field component modifies the ratio of the strength of the first magnetic field component to the strength of the third magnetic field component

FIG. 4

CONTROL STICK INCLUDING A SINGLE MAGNETIC SENSOR FOR TWIST ANGLE AND TILT ANGLE DETECTION

BACKGROUND

A magnetic sensor may be capable of sensing multiple (e.g., perpendicular) components of a magnetic field applied to the magnetic sensor, such as an x-component, a y-component, and a z-component. The magnetic sensor may be used to detect, for example, a movement, a position, an angle of rotation, and/or the like, of a magnet, connected to an object, in a variety of applications, such as an automotive application, an industrial application, or a consumer application.

BRIEF DESCRIPTION OF THE DRAWINGS

FIG. 4 is a flowchart of an example process for determining a twist angle and a tilt angle of a handle of a control stick, as described herein.

DETAILED DESCRIPTION

The following detailed description of example implementations refers to the accompanying drawings. The same reference numbers in different drawings may identify the same or similar elements.

Utility of a control stick (e.g., a joystick) may be improved by a twist function. This means that a handle of the control stick would have a twist function (e.g., left twist/right twist) in addition to one or more tilt functions (e.g., a left/right tilt and/or a forward/backward tilt). Here, the twist function and the one or more tilt functions can be used in association with a control function provided by the control stick (e.g., controlling a drone, a vehicle, an item of industrial equipment, and/or the like). In such cases, magnetic sensing is one technique that may be implemented in association with determining a twist angle of a handle of the control stick and one or more tilt angles of the handle of the control stick.

A conventional magnetic sensing system for determining a twist angle and one or more tilt angles of a control stick uses at least two magnetic circuits (e.g., a first magnetic circuit to measure the left/right and forward/backward tilts, and a second magnetic circuit to determine a twist position). Here, each magnetic circuit includes its own permanent magnet and magnetic sensor. However, such a system has a high cost due to the need for multiple magnetic circuits. Further, such a system may consume a significant amount of space or may be complex to manufacture (e.g., since multiple magnetic circuits may need to be assembled within a relatively small space).

Some implementations described herein provide a control stick including a single magnetic sensor that provides both twist angle detection and tilt angle detection. In some implementations, the implementations described herein may reduce cost, area consumption, and/or complexity of a control stick for which a twist angle and one or more tilt angles are to be determined in association with a control function provided by the control stick (e.g., as compared to a conventional control stick including at least two magnetic circuits).

In some implementations, the control stick may include a magnet (e.g., mounted or housed in a handle of the control stick) and a magnetic sensor (e.g., a three-dimensional (3D) magnetic sensor) to determine the twist angle of the handle of the control stick based on a strength of a magnetic field and may determine one or more tilt angles of the handle of the control stick based on a ratio of strengths of a pair of components of the magnetic field, as described in further detail below. In some implementations, the control stick may be assembled such that a twisting of the handle modifies an air gap between the magnetic sensor in order to change a strength of the magnetic field at the magnetic sensor.

Figure 1:
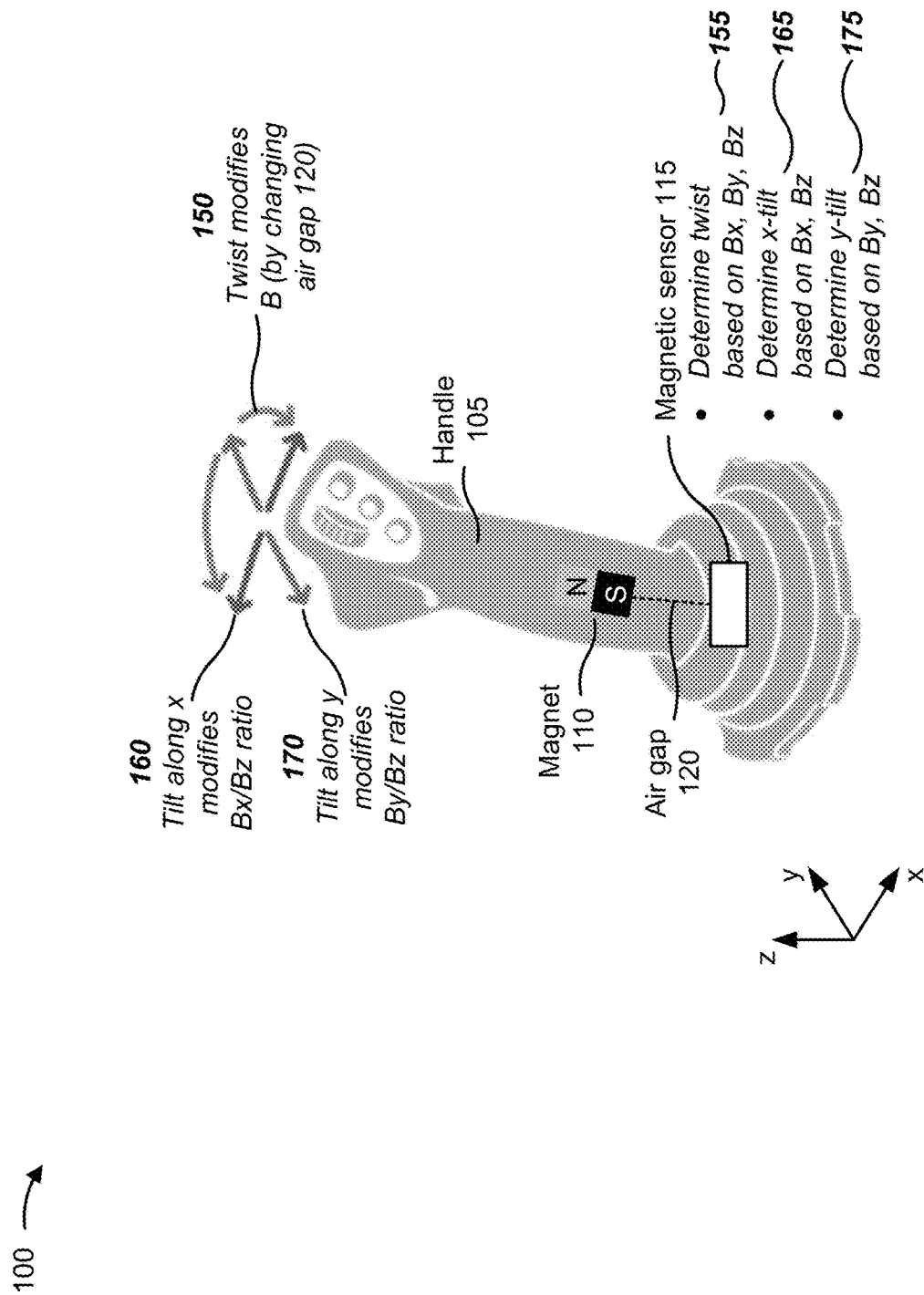
FIG. 1 is a diagram of an example of a control stick including a single magnetic sensor for twist angle and tilt angle detection, as described herein.

FIG. 1 is a diagram of an example control stick 100 including a single magnetic sensor for twist angle and tilt angle detection, as described herein described herein. As shown in FIG. 1, control stick 100 may include a handle 105, a magnet 110, and a magnetic sensor 115. As shown, magnet 110 may be separated from magnetic sensor 115 by an air gap 120.

Handle 105 includes an element of control stick 100 that can be twisted (e.g., about an axis from a tip of handle 105 to a base of handle 105, herein referred to as a long axis of handle 105) and tilted in one or more directions (e.g., a direction corresponding to an x-component of a magnetic field generated by magnet 110 and/or a direction corresponding to a y-component of the magnetic field generated by magnet 110) in association with a control function provided by control stick 100. In some implementations, handle 105 may include an element such as a joystick, a knob, a dial, a wheel, or any combination thereof, that can be used, for example, in association with controlling a device (e.g., a drone, a vehicle, industrial equipment, and/or the like). In some implementations, as indicated in FIG. 1, magnet 110 may be mounted or housed in handle 105. In some implementations, magnet 110 may be affixed to (e.g., attached to, coupled with, affixed to, embedded in, and/or the like) handle 105 (e.g., within an interior of handle 105).

Magnet 110 includes a magnet that may be mounted or housed in handle 105. In some implementations, magnet 110 may be affixed to (e.g., attached to, coupled with, embedded in, and/or the like) handle 105 (e.g., within an interior cavity of handle 105). In some implementations, magnet 110 may be mounted or housed in handle 105 such that a center of magnet 110 is positioned approximately on the long axis of handle 105.

In some implementations, magnet 110 comprises a first half forming a north pole (N) and a second half forming a south pole (S), so that magnet 110 comprises one pole pair. For example, as shown in FIG. 1, magnet 110 may include a diametrally magnetized magnet with a north pole on a first half of magnet 110 and a south pole on a second half of magnet 110. As another example, magnet 110 may include an axially magnetized magnet with a north pole on a first half of magnet 110 that is stacked (e.g., along the z-direction) on a south pole on a second half of magnet 110 (not shown). Additionally, or alternatively, magnet 110 may include a dipole magnet (e.g., a dipole bar magnet, a circular dipole magnet, an elliptical dipole magnet, etc.), a permanent magnet, an electromagnet, a magnetic tape, and/or the like. In some implementations, magnet 110 may, without limitation, comprise more than one pole pair.

In some implementations, magnet 110 may be comprised of a ferromagnetic material (e.g., Hard Ferrite), and may produce a magnetic field. In some implementations, magnet 110 may further comprise a rare earth magnet, which may be of advantage due to an intrinsically high magnetic field strength of rare earth magnets. Notably, while magnet 110 is shown as having a rectangular shape in FIG. 1, magnet 110 may have another shape, such as a square shape, a circular shape, an elliptical shape, a triangular shape, a ring shape, and/or the like.

Magnetic sensor 115 includes one or more elements for sensing components of a magnetic field for use in determining a twist angle of handle 105 and one or more tilt angles of handle 105. For example, magnetic sensor 115 may include one or more circuits (e.g., one or more integrated circuits) that operate to sense an x-component of a magnetic field produced by magnet 110, a y-component of the magnetic field produced by magnet 110, and a z-component of the magnetic field produced by magnet 110 (i.e., magnetic sensor 115 may be a 3D magnetic sensor, such as a 3D Hall sensor). In some implementations, magnetic sensor 115 may include an integrated circuit that includes an integrated controller (e.g., such that an output of magnetic sensor 115 may include information that describes a twist angle and/or one or more tilt angles of handle 105). In some implementations, magnetic sensor 115 may include sensing elements configured to sense the components of the magnetic field produced by magnet 110. Additional details regarding elements of magnetic sensor 115 are described below with regard to FIG. 2.

In some implementations, magnetic sensor 115 may be arranged at a position relative to magnet 110 such that magnetic sensor 115 may measure components of a magnetic field produced by magnet 110. For example, magnetic sensor 115 may be arranged such that magnetic sensor 115 is substantially centered on the long axis of handle 105 with an air gap 120 between magnetic sensor 115 and magnet 110. Here, magnetic sensor 115 may be capable of sensing an x-component, a y-component, and a z-component of the magnetic field produced by magnet 110. During operation, magnetic sensor 115 may measure the x-component of the magnetic field produced by magnet 110, the y-component of the magnetic field produced by magnet 110, and the z-component of the magnetic field produced by magnet 110. Magnetic sensor 115 may then determine a twist angle of handle 105 and/or one or more tilt angles of handle 105 based on strengths of the x-, y-, and z-components of the magnetic field produced by magnet 110.

In some implementations, as illustrated by reference 150, control stick 100 may be assembled such that handle 105 can be twisted about the long axis of handle 105. In implementations, control stick 100 may be assembled such that a twisting of handle 105 about the long axis of handle 105 causes a movement (e.g., a linear movement) of magnet 110 along a direction corresponding to the third component of the magnetic field (i.e., along the long axis of handle 105). In some implementations, the twisting and the movement of magnet 110 are provided via an element, included in control stick 100, that permits twisting and movement of magnet 110, such as a threaded element. An example implementation of control stick 100 including a threaded element is described below in association with FIGS. 3A-3D.

As indicated, a twisting of handle 105 may modify (e.g., decrease or increase) an air gap 120 which, in turn, modifies a strength of the magnetic field (|B|) at magnetic sensor 115 (e.g., by bringing magnet 110 closer to or further from magnetic sensor 115, depending on the direction of the twist). For example, in some implementations, a twisting of handle 105 in a first direction (e.g., a clockwise direction) may decrease air gap 120, thereby increasing the strength of the magnetic field at magnetic sensor 115. Conversely, a twisting of handle 105 in a second direction (e.g., a counter-clockwise direction) may increase air gap 120, thereby reducing the strength of the magnetic field at magnetic sensor 115. In some implementations, magnetic sensor 115 may determine a twist angle of handle 105 of control stick 100 based at least in part on the strength of the magnetic field at magnetic sensor 115. For example, as indicated by reference 155, magnetic sensor 115 may measure a strength of a first magnetic field component (e.g., an x-component of the magnetic field generated by magnet 110 ($B_x$)), a strength of a second magnetic field component (e.g., a y-component of a magnetic field generated by magnet 110 ($B_y$)), and a strength of a third magnetic field component (e.g., a z-component of a magnetic field generated by magnet 110 ($B_z$)). Here, magnetic sensor 115 may calculate the strength of the magnetic field (|B|) based on the first, second, and third magnetic field components using, for example, the following formula:

$$|B| = \sqrt{Bx^2 + By^2 + Bz^2}$$

Magnetic sensor 115 may then determine the twist angle of handle 105 based on the strength of the magnetic field (e.g., using a lookup table associating magnetic field strengths with twist angles, using an algorithm configured on magnetic sensor 115, and/or the like).

In some implementations, as illustrated by reference 160, control stick 100 may be assembled such that handle 105 can be tilted in a first direction (e.g., a direction corresponding to an x-component of the magnetic field). As indicated, a tilting of handle 105 in the first direction may modify a ratio of the strength of the first magnetic field component to the strength of the third magnetic field component (e.g., a $B_x/B_z$ ratio). In some implementations, magnetic sensor 115 may determine a first tilt angle (e.g., a tilt angle in the first direction) based at least in part on the strength of the first magnetic field component and the strength of the third magnetic field component. For example, as indicated by reference 165, magnetic sensor 115 may measure the strength of the first magnetic field component and the strength of the third magnetic field component. Here, magnetic sensor 115 may calculate the ratio of the strength of the first magnetic field component to the strength of the third magnetic field component, and may determine the first tilt angle of handle 105 based on the ratio (e.g., using a lookup table associating $B_x/B_z$ ratios with first tilt angles, using an algorithm configured on magnetic sensor 115, and/or the like).

In some implementations, as illustrated by reference 170, control stick 100 may be assembled such that handle 105 can be tilted in a second direction (e.g., a direction corresponding to an y-component of the magnetic field). As indicated, a tilting of handle 105 in the second direction may modify a ratio of the strength of the second magnetic field component to the strength of the third magnetic field component (e.g., a $B_y/B_z$ ratio). In some implementations, magnetic sensor 115 may determine a second tilt angle (e.g., a tilt angle in the second direction) based at least in part on the strength of the second magnetic field component and the strength of the third magnetic field component. For example, as indicated by reference 175, magnetic sensor 115 may measure the strength of the second magnetic field component and the strength of the third magnetic field component. Here, magnetic sensor 115 may calculate the ratio of the strength of the second magnetic field component to the strength of the third magnetic field component, and may determine the second tilt angle of handle 105 based on the ratio (e.g., using a lookup table associating $B_y/B_z$ ratios with second tilt angles, using an algorithm configured on magnetic sensor 115, and/or the like). In some implementations, control stick 100 may be assembled such that handle 105 can be tilted in both the first direction and the second direction concurrently.

In some implementations, magnetic sensor 115 may provide (e.g., to a device controlled by control stick 100, to a controller, and/or the like) one or more signals indicative of the twist angle of handle 105 and/or indicative of one or more tilt angles of handle 105, as determined by magnetic sensor 115. In some implementations, a given signal of the one or more signals may be indicative of the twist angle of handle 105 only, may be indicative of the one or more tilts angle of handle 105 only (e.g., a single tilt angle, two tilt angles), or may be indicative of both the twist angle of handle 105 and of the one or more tilt angles of handle 105.

As indicated above, FIG. 1 is provided merely as an example. Other examples may differ from what is described with regard to FIG. 1.

Figure 2:
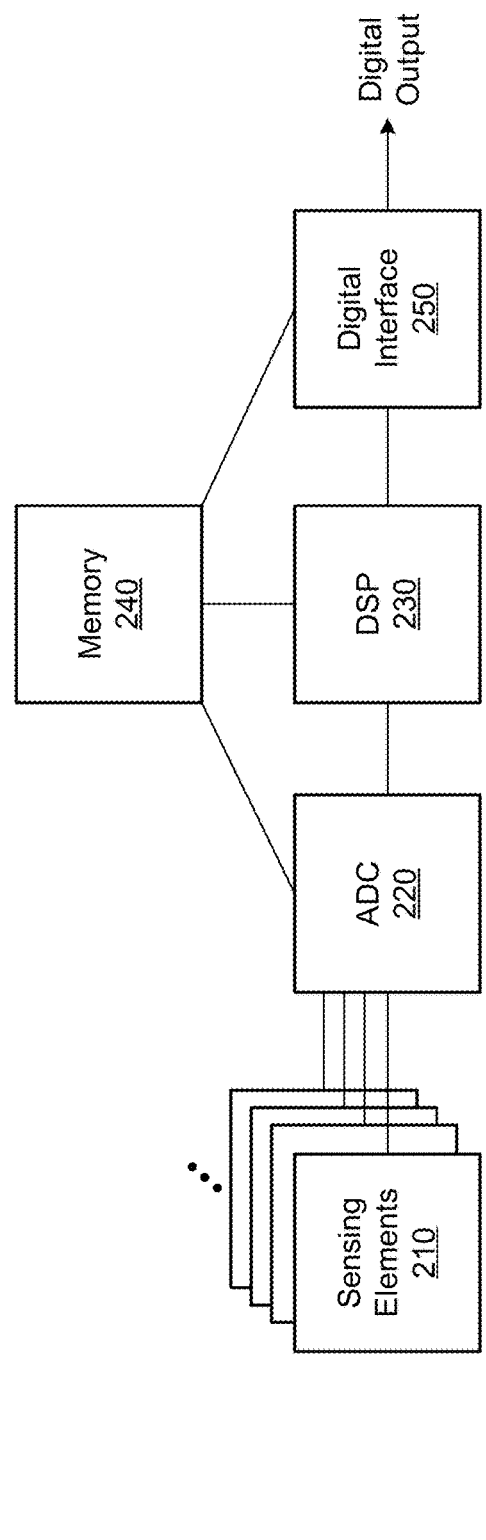
FIG. 2 is a diagram of example components of the magnetic sensor of FIG. 1.

FIG. 2 is a diagram of example components of magnetic sensor 115 in FIG. 1. As shown in FIG. 2, magnetic sensor 115 may include a set of sensing elements 210, an analog-to-digital convertor (ADC) 220, a digital signal processor (DSP) 230, a memory element 240, and a digital interface 250.

Sensing element 210 includes an element for sensing a component of a magnetic field present at magnetic sensor 115 (e.g., the magnetic field generated by magnet 110). For example, sensing element 210 may include a Hall-based sensing element that operates based on a Hall-effect. As another example, sensing element 210 may include a MR-based sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 210 may operate based on an anisotropic magnetoresistance (AMR) effect, a giant magnetoresistance (GMR) effect, a tunnel magnetoresistance (TMR) effect, and/or the like. As an additional example, sensing element 210 may include a variable reluctance (VR) based sensing element that operates based on induction.

In some implementations, magnetic sensor 115 may include multiple sensing elements 210. For example, magnetic sensor 115 may include a first sensing element 210 (e.g., including a first set of vertical Hall plates) that operates to sense an x-component of the magnetic field, a second sensing element 210 (e.g., including a second set of vertical Hall plates) that operates to sense a y-component of the magnetic field, and a third sensing element 210 (e.g., including a set of lateral Hall plates) that operates to sense a z-component of the magnetic field.

ADC 220 may include an analog-to-digital converter that converts an analog signal from the set of sensing elements 210 to a digital signal. For example, ADC 220 may convert analog signals, received from the set of sensing elements 210, into digital signals to be processed by DSP 230. ADC 220 may provide the digital signals to DSP 230. In some implementations, magnetic sensor 115 may include one or more ADCs 220.

DSP 230 may include a digital signal processing device or a collection of digital signal processing devices. In some implementations, DSP 230 may receive digital signals from ADC 220 and may process the digital signals to form output signals (e.g., destined for a controller associated with the magnetic sensor system (not shown)), such as an output signal associated with one or more tilt angles of handle 105, a twist angle of handle 105, and/or the like, as described elsewhere herein (e.g., the output signal may be indicative of the twist angle of handle 105, indicative of one or more tilts angle of handle 105, or indicative of both the twist angle of handle 105 and the one or more tilt angles of handle 105).

Memory element 240 may include a read only memory (ROM) (e.g., an EEPROM), a random access memory (RANI), and/or another type of dynamic or static storage device (e.g., a flash memory, a magnetic memory, an optical memory, etc.) that stores information and/or instructions for use by magnetic sensor 115. In some implementations, memory element 240 may store information associated with processing performed by DSP 230. Additionally, or alternatively, memory element 240 may store configurational values or parameters for the set of sensing elements 210 and/or information for one or more other elements of magnetic sensor 115, such as ADC 220 or digital interface 250.

Digital interface 250 may include an interface via which magnetic sensor 115 may receive and/or provide information from and/or to another device, such as a controller associated with the magnetic sensor system. For example, digital interface 250 may provide the output signal, determined by DSP 455 230, to the controller and may further receive information from the controller.

The number and arrangement of components shown in FIG. 2 are provided as one or more examples. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of magnetic sensor 115 may perform one or more functions described as being performed by another set of components of magnetic sensor 115.

FIGS. 3A-3D are diagrams associated with an example implementation 300 of control stick 100 including a single magnetic sensor 115 for twist angle detection and tilt angle detection.

As indicated in FIG. 3, a twisting of handle 105 causes a movement (illustrated in FIG. 3 as a linear movement in a vertical direction) of magnet 110 in a direction along a length of handle 105. In example implementation 300, the twisting and the movement are provided via a threaded element, included in control stick 100, that that permits twisting and movement of magnet 110 relative to magnetic sensor 115.

In some implementations, control stick 100 may include an element that causes a twist of handle 105 to move magnet 110 relative to magnetic sensor 115, as illustrated in example implementation 300. Alternatively, control stick 100 may include an element or that causes a twist of handle 105 to move magnetic sensor 115 relative to magnet 110, in some implementations. Notably, while a threaded element is illustrated in example implementation 300, any other type of mechanism that causes a twist of handle 105 to modify air gap 120 (e.g., the distance between magnet 110 and magnetic sensor 115) can be used (rather than a threaded element).

In some implementations, control stick 100 may be assembled such that a twist of handle 105 causes magnet 110 to twist about a long axis of handle 105 and move along the long axis of handle 105, as illustrated in example implementation 300. Alternatively, control stick 100 may be assembled such that a twist of handle 105 causes magnet 110 to be twisted in another (arbitrary) manner.

Figure 3A:
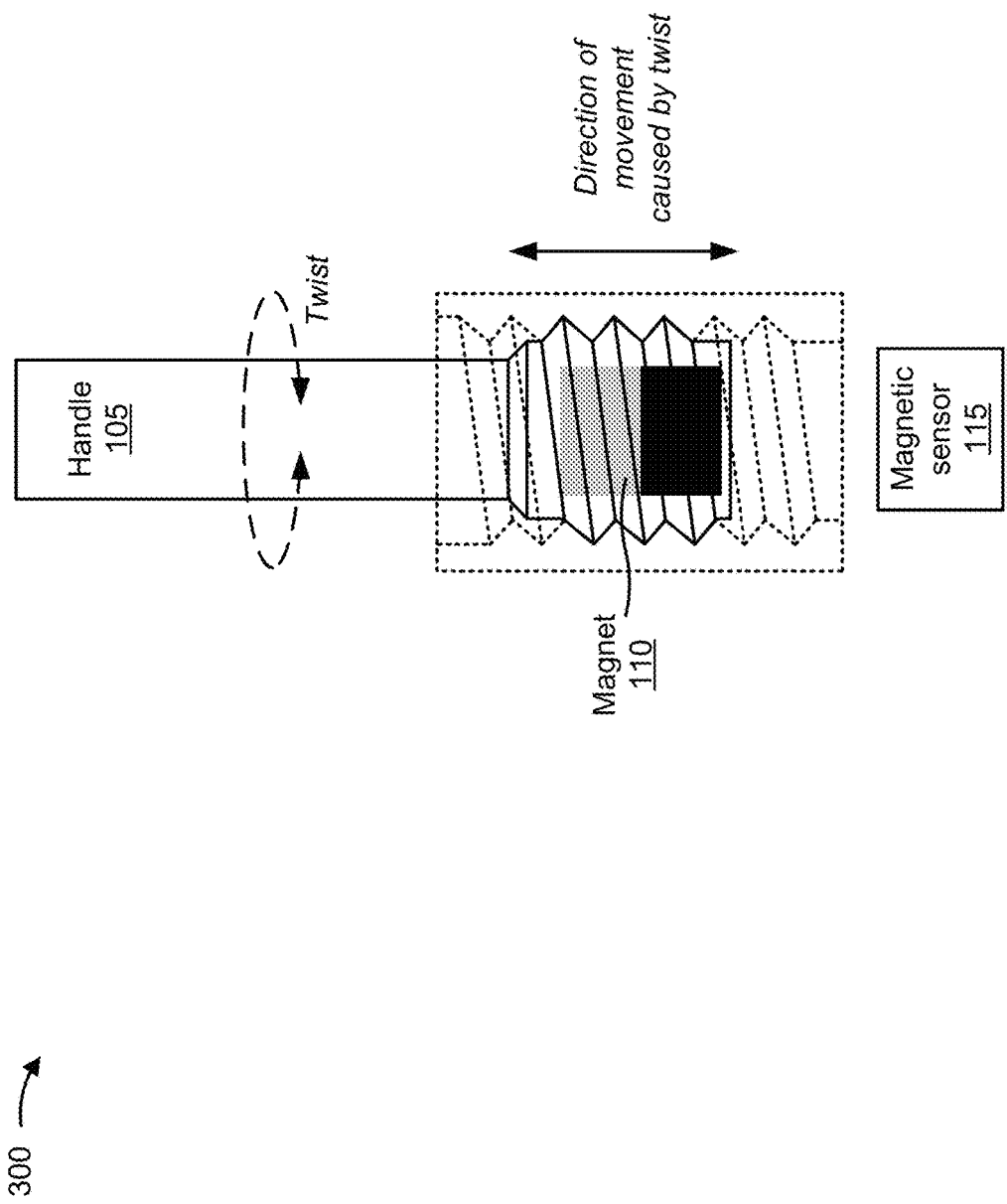
FIGS. 3A-3D are diagrams associated with an example implementation of a control stick including a single magnetic sensor for twist angle detection and tilt angle detection.
Figure 3B:
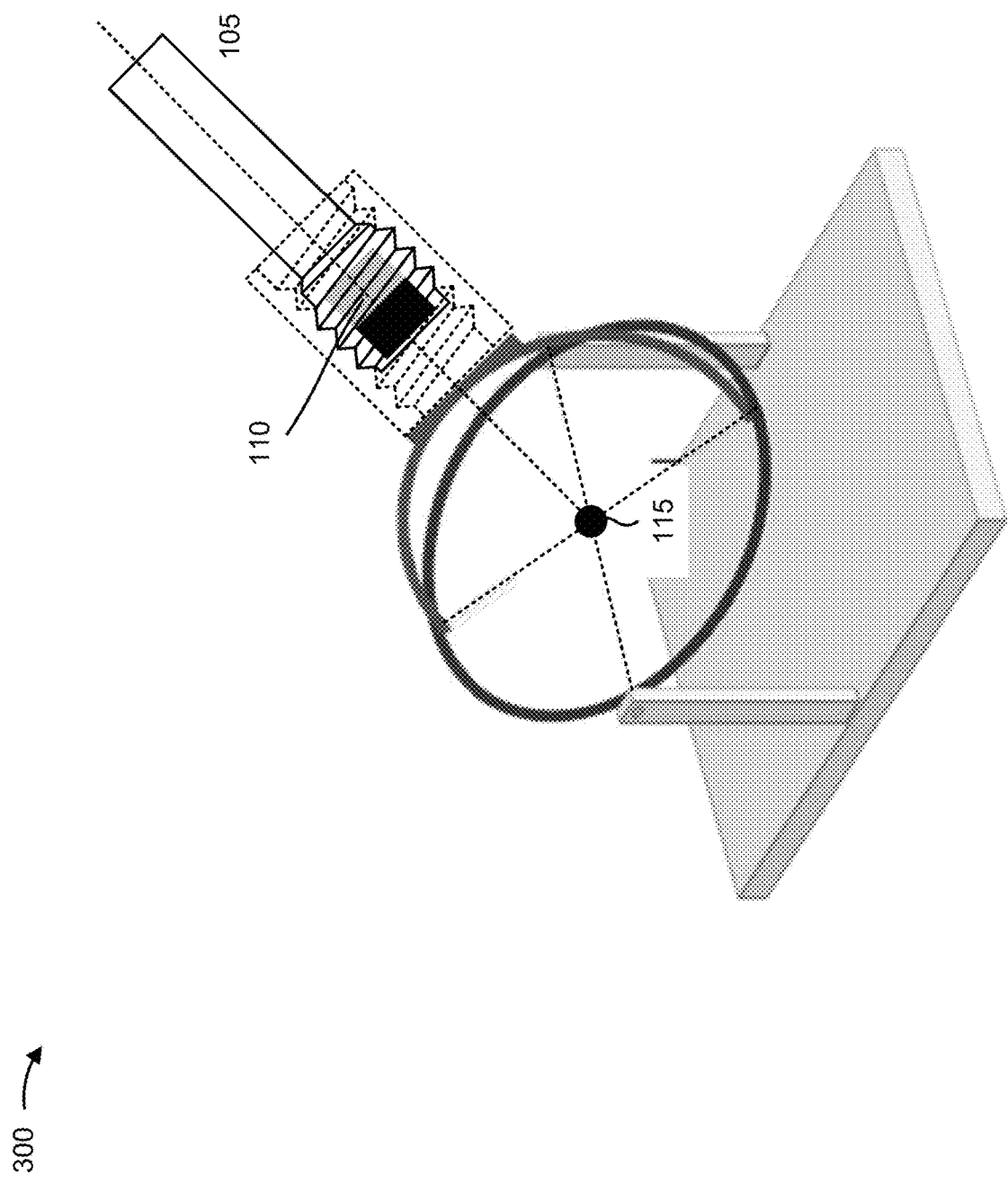

In some implementations, control stick 100 may be assembled such that the three axes of movement (e.g., left/right, forward/backward, and twist left/twist right) cross at a center of a sensitive area of magnetic sensor 115. FIG. 3B is a diagram illustrating a configuration of control stick 100 in which the three axes of movement cross at a center of a sensitive area of magnetic sensor 115.

Figure 3C:
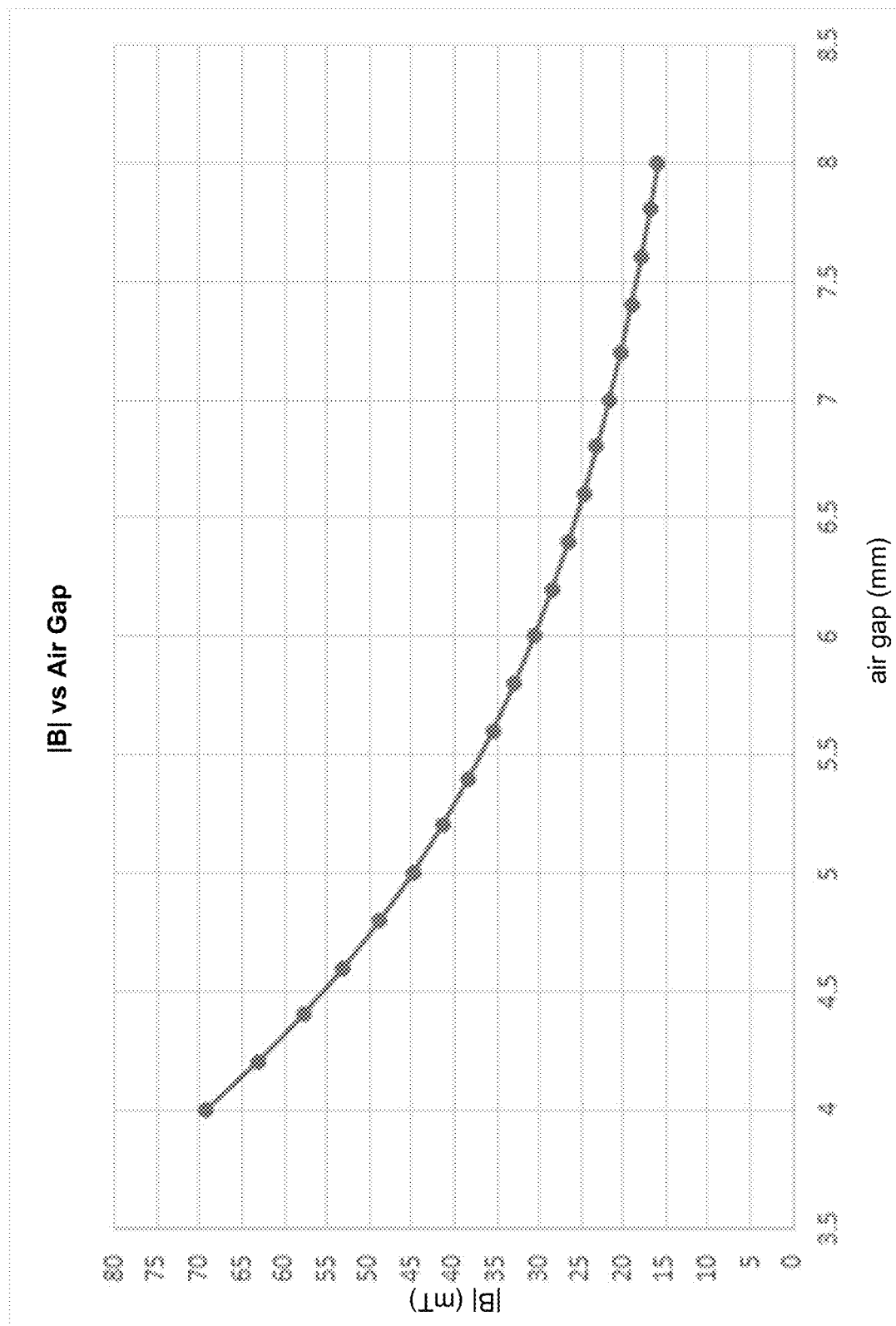
Figure 3D:
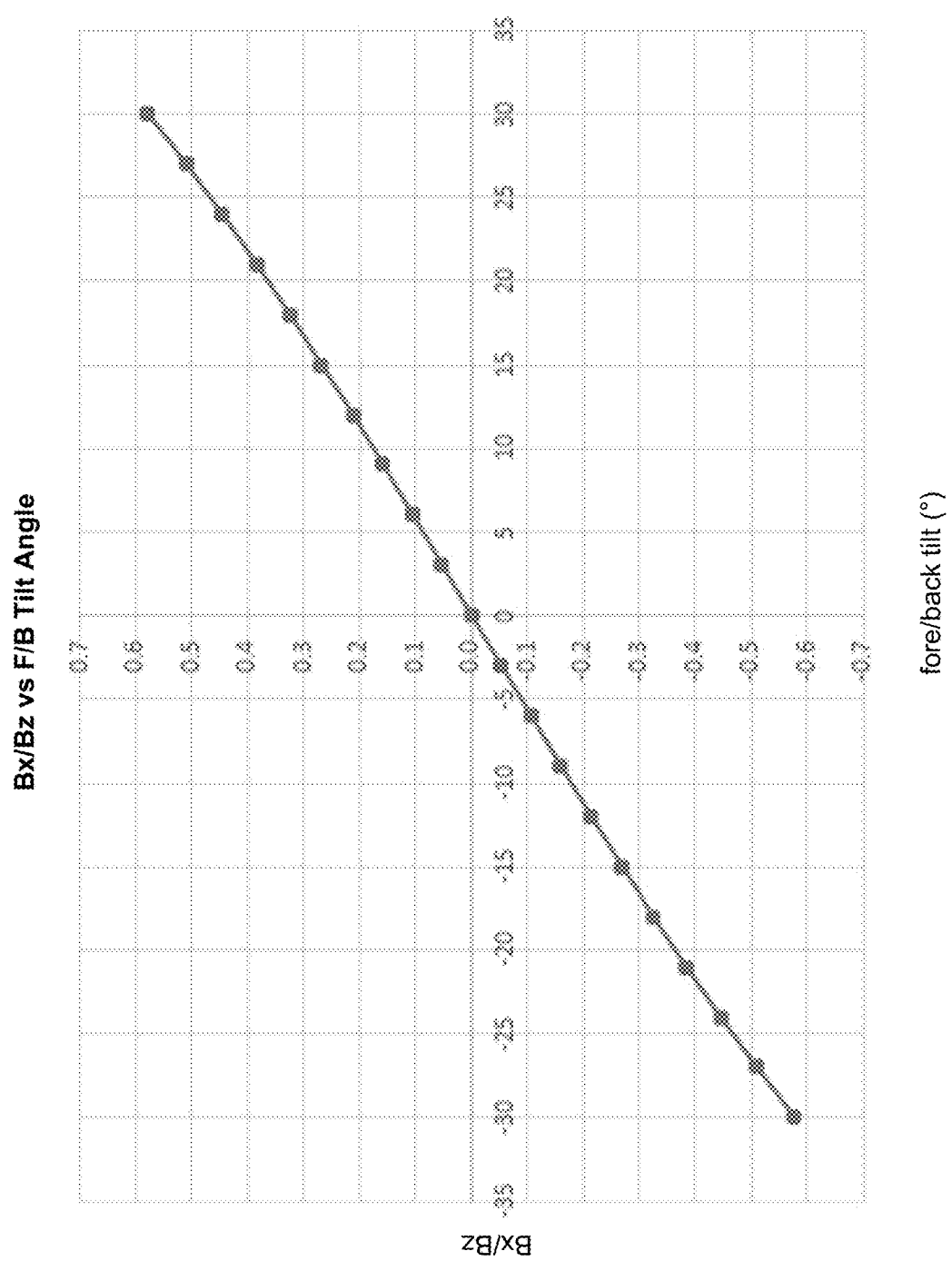

FIGS. 3C and 3D provide example simulation results associated with example implementation 300 of control stick 100. FIG. 3C shows example simulation results illustrating dependence of a strength of a magnetic field at magnetic sensor 115 (|B|) on an air gap between magnet 110 and magnetic sensor 115 (e.g., air gap 120). As described above, a twist of handle 105 causes air gap 120 to be modified. Here, the strength of the magnetic field at magnetic sensor 115 is dependent on air gap 120. Similar results are present regardless of a tilt angle of handle 105 in any direction, meaning that a twist angle of handle 105 can be determined based on the strength of the magnetic field at magnetic sensor 115 regardless of any tilt of handle 105. Therefore, magnetic sensor 115 may derive the twist angle of handle 105 based on the strength of the magnetic field, as described above (e.g., using a lookup table that associates magnetic field strengths with twist angles, using an algorithm configured on magnetic sensor 115, and/or the like).

FIG. 3D shows example simulation results illustrating dependence of a ratio of a strength of a $B_x$ component of the magnetic field to a $B_z$ component of the magnetic field component on a forward/backward tilt of handle 105. FIG. 3D shows that, the tilting of handle 105 in the x-direction generates a nearly linear function (even without arctan calculation). Similar results are present regardless of a twist angle of handle 105, meaning that a forward/backward tilt angle of handle 105 can be determined based on a ratio of $B_x/B_z$ regardless of the twist angle of handle 105.

Similar results are also present in the case of a left/right tilt of handle 105, meaning that a ratio of a strength of a $B_y$ component of the magnetic field to a $B_z$ component of the magnetic field component depends on a left/right tilt of handle 105. Therefore, a tilting of handle 105 in the y-direction generates a nearly linear function (even without arctan calculation). These results are present regardless of a twist angle of handle 105, meaning that a forward/backward tilt angle of handle 105 can be determined based on a ratio of $B_y/B_z$ regardless of the twist angle of handle 105.

In some implementations, calculation of a tilt angle (e.g., left/right, forward/backward) without using an arctan function reduces complexity in association with determining a tilt angle of handle 105, meaning that example implementation 300 of control stick 100 can further reduce complexity, size, and cost of the sensor system.

As indicated above, FIGS. 3A-3D are provided merely as examples. Other examples may differ from what is described with regard to FIGS. 3A-3D.

FIG. 4 is a flowchart of an example process for determining a twist angle and a tilt angle of handle 105, as described herein. In some implementations, one or more process blocks of FIG. 4 may be performed by a magnetic sensor (e.g., magnetic sensor 115).

As shown in FIG. 4, process 400 may include determining a twist angle of a handle of a control stick based on a strength of a magnetic field (block 410). For example, magnetic sensor 115 (e.g., using sensing elements 210, ADC 220, DSP 230, memory 240, and/or the like) may determine a twist angle of handle 105 of control stick 100 based on a strength of a magnetic field produced by magnet 110, as described above. In some implementations, a twisting of handle 105 may modify air gap 120 between magnetic sensor 115 and magnet 110 that produces the magnetic field. In some implementations, wherein the strength of the magnetic field is based on a strength of a first magnetic field component (e.g., an x-component), a strength of a second magnetic field component (e.g., a y-component), and a strength of a third magnetic field component (e.g., a z-component). In some implementations, the first magnetic field component, the second magnetic field component, and the third magnetic field component are orthogonal components of the magnetic field.

As further shown in FIG. 4, process 400 may include determining a tilt angle of the handle of the control stick based on a ratio of the strength of the first magnetic field component to the strength of the third magnetic field component (block 420). For example, magnetic sensor 115 (e.g., using sensing elements 210, ADC 220, DSP 230, memory 240, and/or the like) may determine a tilt angle of handle 105 of control stick 100 based on a ratio of the strength of the first magnetic field component to the strength of the third magnetic field component, as described above. In some implementations, a tilting of handle 105 in a direction corresponding to the first magnetic field component may modify the ratio of the strength of the first magnetic field component to the strength of the third magnetic field component.

Process 400 may include additional implementations, such as any single implementation or any combination of implementations described below and/or in connection with one or more other processes described elsewhere herein.

In some implementations, the tilt angle is a first tilt angle, and magnetic sensor 115 may determine a second tilt angle of handle 105 of control stick 100 based on a ratio of the strength of the second magnetic field component to the strength of the third magnetic field component. Here, a tilting of handle 105 in a direction corresponding to the second magnetic field component may modify the ratio of the strength of the second magnetic field component to the strength of the third magnetic field component.

In some implementations, magnetic sensor 115 may determine the strength of the magnetic field based on the strength of the first magnetic field component, the strength of the second magnetic field component, and the strength of the third magnetic field component.

In some implementations, the twisting of handle 1015 may cause a movement of magnet 110 along a direction corresponding to the third component of the magnetic field.

In some implementations, the twisting and the movement are provided via a element, included in control stick 100, that that permits twisting and movement of the magnet (e.g., a threaded element).

In some implementations, magnetic sensor may be a 3D Hall sensor.

In some implementations, magnetic sensor 115 may provide a signal indicative of at least one of the twist angle or the tilt angle.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide control stick 100 including a single magnetic sensor 115 that provides both twist angle detection and tilt angle detection. In some implementations, the implementations described herein may reduce cost, area consumption, and/or complexity of control stick 100 for which a twist angle and one or more tilt angles are to be determined in association with a control function provided by control stick 100 (e.g., as compared to a conventional control stick including at least two magnetic circuits).

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A control stick, comprising:
   a magnet; and
   a three-dimensional (3D) magnetic sensor configured to:
      determine a twist angle, of a handle of the control stick, based on a strength of a magnetic field at the 3D magnetic sensor,
         wherein the twist angle modifies an air gap between the 3D magnetic sensor and the magnet, and
         wherein the strength of the magnetic field is based on a strength of a first magnetic field component, a strength of a second magnetic field component, and a strength of a third magnetic field component,
            wherein the first magnetic field component, the second magnetic field component, and the third magnetic field component are orthogonal components of the magnetic field; and
      determine a tilt angle, of the handle of the control stick, based on a ratio of the strength of the first magnetic field component relative to the strength of the third magnetic field component,
         wherein a tilting of the handle in a direction corresponding to the first magnetic field component modifies the ratio of the strength of the first magnetic field component relative to the strength of the third magnetic field component.

2. The control stick of claim 1, wherein the tilt angle is a first tilt angle, and wherein the 3D magnetic sensor is further configured to:
   determine a second tilt angle, of the handle of the control stick, based on a ratio of the strength of the second magnetic field component relative to the strength of the third magnetic field component,
      wherein a tilting of the handle in a direction corresponding to the second magnetic field component modifies the ratio of the strength of the second magnetic field component relative to the strength of the third magnetic field component.

3. The control stick of claim 1, wherein the 3D magnetic sensor is further configured to:
   determine the strength of the magnetic field based on the strength of the first magnetic field component, the strength of the second magnetic field component, and the strength of the third magnetic field component.

4. The control stick of claim 1, wherein the twist angle of the handle causes a movement of the magnet along a direction corresponding to the third magnetic field component.

5. The control stick of claim 4, wherein the twist angle and the movement are provided via an element, included in the control stick, that permits the twisting and the movement of the magnet.

6. The control stick of claim 1, wherein the 3D magnetic sensor is a 3D Hall sensor.

7. The control stick of claim 1, wherein the 3D magnetic sensor is further to:
   provide a signal indicative of at least one of the twist angle or the tilt angle.

8. A sensor system, comprising:
   a magnet; and
   a magnetic sensor configured to:
      determine a twist angle, of a handle of a control stick, based on a strength of a first magnetic field component, a strength of a second magnetic field component, and a strength of a third magnetic field component, wherein the twist angle modifies an air gap between the magnetic sensor and the magnet, and wherein the first magnetic field component, the second magnetic field component, and the third magnetic field component are orthogonal components of a magnetic field; and determine a set of tilt angles, of the handle of the control stick, based on at least two of the strength of the first magnetic field component, the strength of the second magnetic field component, or the strength of the third magnetic field component.

9. The sensor system of claim 8, wherein the magnetic sensor is a three-dimensional magnetic sensor.

10. The sensor system of claim 8, wherein the magnetic sensor is further configured to:

determine a strength of the magnetic field based on the first magnetic field component, the second magnetic field component, and the third magnetic field component, and wherein the magnetic sensor, when determining the twist angle, is further configured to:

determine the twist angle based on the strength of the magnetic field.

11. The sensor system of claim 8, wherein the twist angle causes a movement of the magnet in a direction along a length of the handle.

12. The sensor system of claim 11, wherein the twist angle and the movement are provided via an element, included in the control stick, that permits twisting and movement of the magnet.

13. The sensor system of claim 8, wherein the magnetic sensor includes a set of Hall-based sensing elements.

14. The sensor system of claim 8, wherein the magnetic sensor is further configured to:

provide a signal indicating at least one of the twist angle or the set of tilt angles.

15. A method, comprising:

determining a twist angle, of a handle of a control stick, based on a strength of a magnetic field, wherein the twist angle modifies an air gap between a magnetic sensor and a magnet that produces the magnetic field, and wherein the strength of the magnetic field is based on a strength of a first magnetic field component, a strength of a second magnetic field component, and a strength of a third magnetic field component, wherein the first magnetic field component, the second magnetic field component, and the third magnetic field component are orthogonal components of the magnetic field; and determining a tilt angle, of the handle of the control stick, based on a ratio of the strength of the first magnetic field component relative to the strength of the third magnetic field component, wherein a tilting of the handle in a direction corresponding to the first magnetic field component modifies the ratio of the strength of the first magnetic field component relative to the strength of the third magnetic field component.

16. The method of claim 15, wherein the tilt angle is a first tilt angle, and wherein the method further comprises:

determining a second tilt angle, of the handle of the control stick, based on a ratio of the strength of the second magnetic field component relative to the strength of the third magnetic field component, wherein a tilting of the handle in a direction corresponding to the second magnetic field component modifies the ratio of the strength of the second magnetic field component relative to the strength of the third magnetic field component.

17. The method of claim 15, further comprising:

determining the strength of the magnetic field based on the strength of the first magnetic field component, the strength of the second magnetic field component, and the strength of the third magnetic field component.

18. The method of claim 15, wherein a twisting of the handle causes a movement of the magnet along a direction corresponding to the third magnetic field component.

19. The method of claim 18, wherein the twisting and the movement are provided via an element, included in the control stick, that that permits the twisting and the movement of the magnet.

20. The method of claim 15, wherein the magnetic sensor is a three-dimensional Hall sensor.

* * * * *